Figure 1:
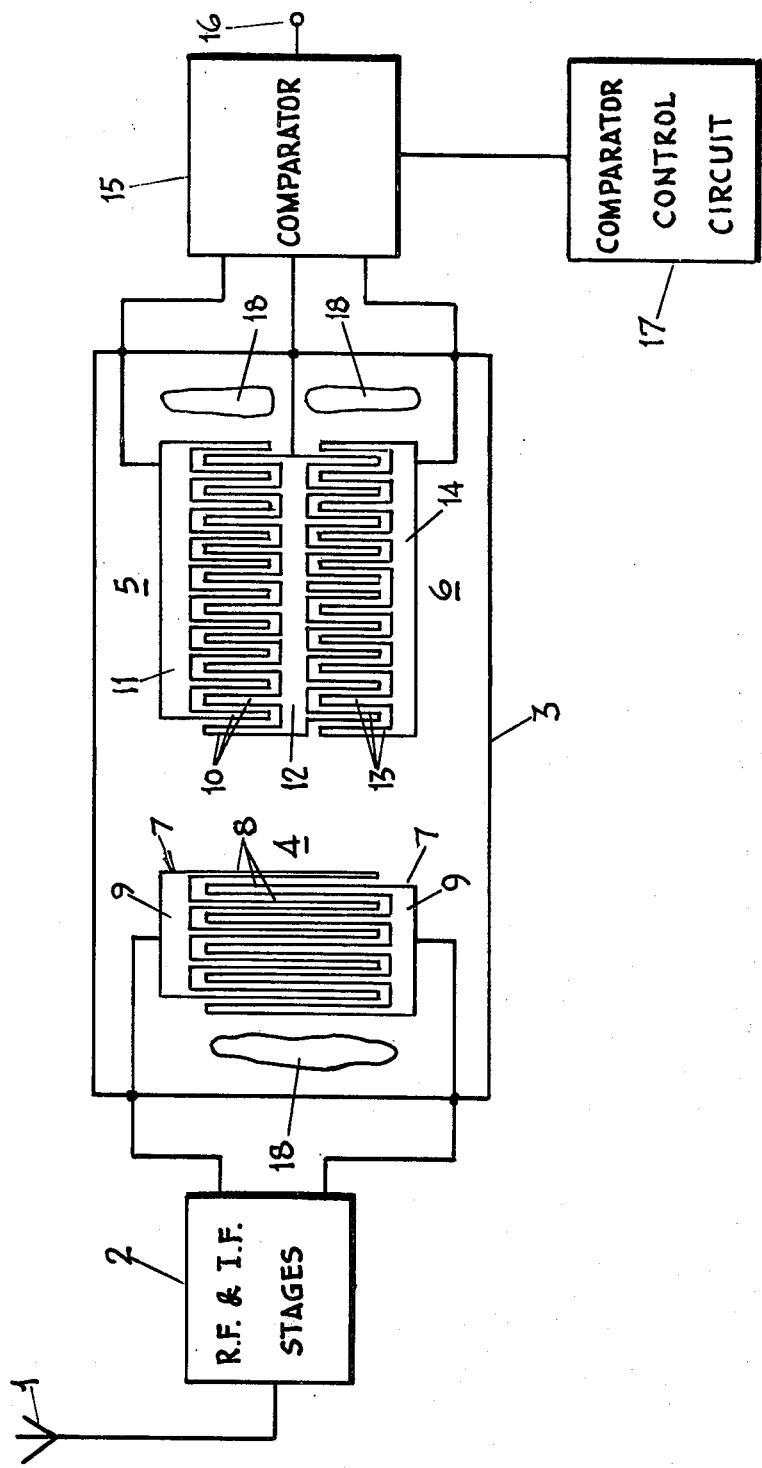

United States Patent [19]
Scotter

[11] 3,980,962
[45] Sept. 14, 1976

[54] DEMODULATORS

[75] Inventor: Dennis George Scotter, Wembley, England

[73] Assignee: The General Electric Company Limited, London, England

[22] Filed: Feb. 4, 1975

[21] Appl. No.: 547,004

[30] Foreign Application Priority Data
Feb. 15, 1974  United Kingdom................. 6958/74

[52] U.S. Cl. ............................... 329/117; 325/349; 329/107; 333/72
[51] Int. Cl.² .......................................... H03K 9/04
[58] Field of Search .......... 329/117, 193, 198, 104, 329/107; 331/107 A; 333/30 R, 72 R; 325/349

[56] References Cited
UNITED STATES PATENTS

| | | | |
|---|---|---|---|
| 3,626,309 | 12/1971 | Knowles | 329/117 |
| 3,678,364 | 7/1972 | De Vries | 329/117 |
| 3,680,007 | 7/1972 | Tseng | 333/30 R |
| 3,714,594 | 1/1973 | Adler | 329/117 |
| 3,835,422 | 9/1974 | Hartemann | 333/30 |
| 3,836,876 | 9/1974 | Marshal et al. | 330/30 |

Primary Examiner—John Kominski
Attorney, Agent, or Firm—Kirschstein, Kirschstein, Ottinger & Frank

[57] ABSTRACT

A demodulator for a digital code differential phase shift modulated signal comprising: an input transducer for launching surface acoustic waves corresponding to a received modulated signal; a plurality of output transducers each of which is arranged to produce an output signal dependent on the relative phases of a number of successive code elements of said surface acoustic waves, each output transducer producing a larger output signal, in a predetermined sense, than any other output transducer when said successive elements have a particular phase relation, different for each output transducer; and means responsive to the relative magnitudes of the outputs of said output transducers.

8 Claims, 2 Drawing Figures

DEMODULATORS

This invention relates to demodulators.

The invention relates particularly to demodulators for use in communication systems employing digital code differential phase shift modulation.

It is an object of the present invention to provide such a demodulator of novel form.

According to the present invention a demodulator, for use in a communication system employing digital code differential phase shift modulation, comprises: an input transducer for launching on a substrate surface acoustic waves corresponding to a digital code differential phase shift modulated signal; a plurality of output transducers each of which is arranged to produce an output signal dependent on the relative phases of a number of successive code elements of said surface acoustic waves, each output transducer producing a larger output signal, in a predetermined sense, than any other output transducer when said successive elements have a particular phase relation, different for each output transducer; and means responsive to the relative magnitudes of the outputs of said output transducers.

In one particular arrangement in accordance with the invention for use in a communication system employing binary code differential phase shift modulation, two said output transducers are provided both of which are arranged to produce an output signal dependent on the relative phases of two successive bits of said surface acoustic waves, one output transducer producing the larger output signal when the two successive bits are in phase and the other output transducer producing the larger output signal when the two successive bits differ in phase by an amount corresponding to the differential phase shift employed in modulation.

The output transducers are suitably of the kind comprising two conducting film electrodes each comprising a set of fingers which are electrically connected together at one end, the two sets of fingers being interdigitated. In a binary code differential phase shift demodulator in accordance with the invention each output transducer suitably comprises two groups of n interdigitated fingers spaced apart in the direction of propagation of the acoustic waves, the two groups of fingers of said one transducer giving rise to output signals which are in phase when said two successive bits are in phase, and the two groups of fingers of said other transducer giving rise to output signals which are in phase when said two successive bits differ in phase by an amount corresponding to said differential phase shift.

Preferably the centres of the two groups of fingers of each transducer are spaced by a distance substantially equal to the space occupied by one bit of the surface acoustic waves. The centres of each adjacent pair of fingers in each group are normally spaced by a distance equal to the distance between adjacent peaks of the surface acoustic waves, in which case $n$ will have a value not greater than the number of half cycles in one bit of the surface acoustic waves.

The input transducer is also suitably of the interdigitated finger type.

Figure 2:
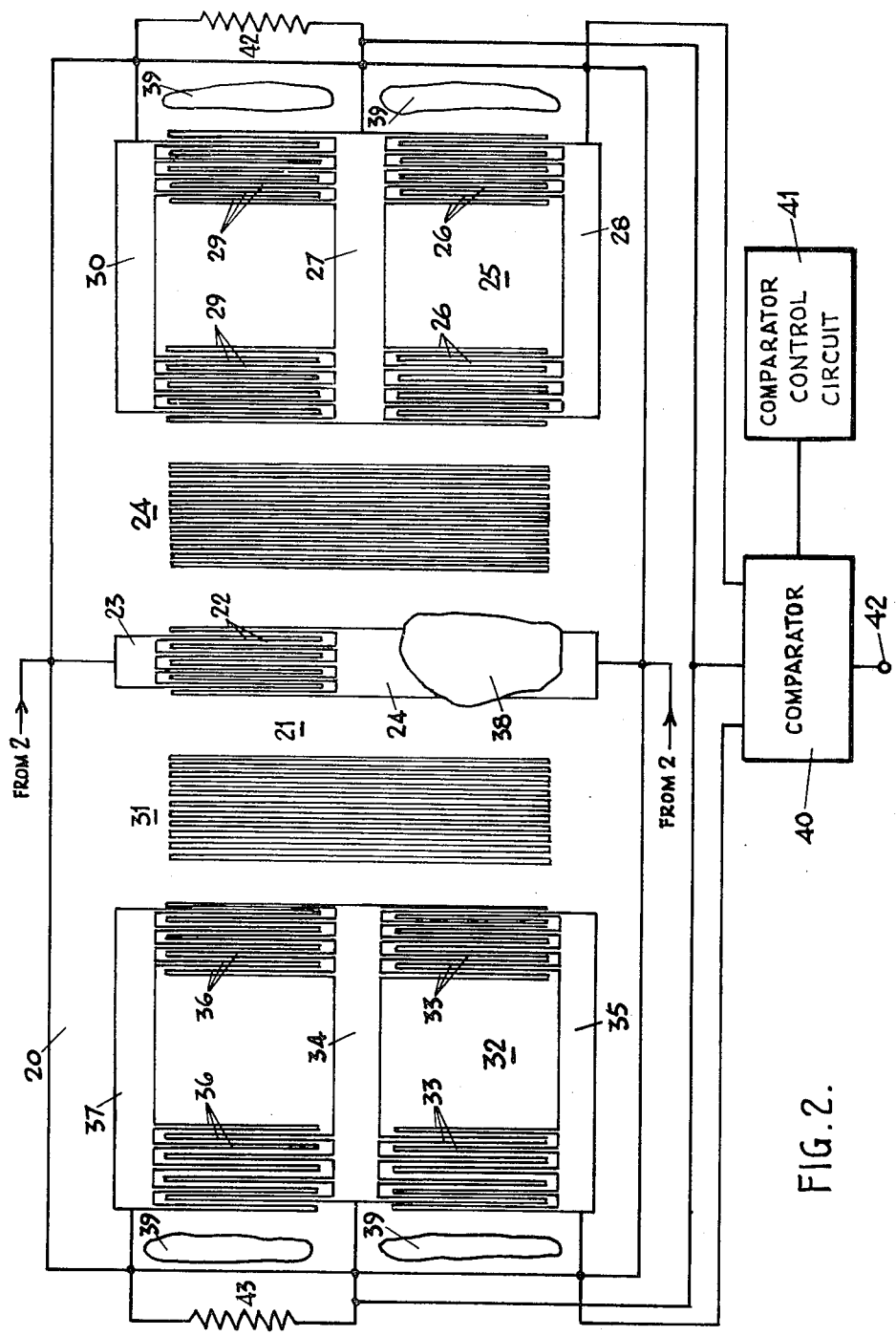

Two arrangements in accordance with the invention will now be described, by way of example, with reference to the accompanying drawing in which:

FIG. 1 is a diagram of a receiver for use in a communication system employing binary code differential phase shift modulation; and FIG. 2 is a diagram of an alternative form of part of the receiver of FIG. 1.

The transmitted signal comprises a carrier wave of predetermined frequency whose phase is changed by 180° in response to each occurrence of a logic 1 in a binary signal required to be transmitted.

Referring to FIG. 1, at the receiver the received signal is fed from an aerial 1 to conventional radio frequency and intermediate frequency amplifying stages 2, the i.f. output signal being passed to a demodulator. The demodulator incorporates a surface acoustic wave device including a substrate 3 of a suitable piezoelectric material such as ST cut quartz. On the surface of the substrate 3 there are formed an input transducer 4 and two output transducers 5 and 6 of the interdigitated finger type.

The input transducer 4 comprises a pair of metal film electrodes 7 each electrode comprising a set of fingers 8 extending from a metallised area 9 which constitutes a terminal of the transducer 4, the fingers of the two electrodes being interdigitated in parallel spaced relation. The transducer 4 has the same number of finger pairs as there are cycles in one bit of the i.f. output signal. In the drawing five such finger pairs are shown for simplicity, but in practice the number of cycles per bit and hence the number of finger pairs is normally larger, e.g. ten, the number of cycles per bit depending on the bit rate. The width of each finger and the spacing between each adjacent pair of fingers is a quarter of the wavelength of surface acoustic waves in the material of the substrate at the i.f. frequency.

The output transducers 5 and 6 are positioned at equally spaced positions from the input transducer 4, alongside one another, so that both output transducers are responsive to the same part of surface acoustic waves launched onto the substrate by the input transducer 4.

The fingers 10 of the output transducer 5 extend from respective terminals 11 and 12 and the fingers 13 of the output transducer 6 extend from respective terminals 12 and 14, the two output transducers thus sharing a common output terminal 12.

The output transducer 5 has twice as many finger pairs as there are cycles in one bit of the i.f. output signal, (10 finger pairs therefore being shown in the drawing) and the widths and spacings of the fingers 11 are as in the input transducer 4.

The output transducer 6 is of similar construction except that the five finger pairs further from the input transducer 4, are reversed with respect to the terminals 12 and 14.

The terminals 11, 12 and 14 are connected to respective inputs of a comparator 15 which, as further explained below produces a negative or a positive signal at an output 16 in dependence on whether the output transducer 5 or the output transducer 6 is producing the larger output signal, operation of the comparator being controlled by a circuit 17.

Unwanted surface acoustic waves are absorbed by blobs 18 of lossy material, such as black wax, appropriately positioned on the substrate.

In operation of the receiver, the input transducer 4 launches onto the surface of the substrate in a direction perpendicular to the length of its fingers 8 a surface acoustic wave corresponding to the i.f. output signal. The output transducers 5 and 6 are positioned so that at any given moment the same two-bit long portion of this surface acoustic wave lies under the fingers of both output transducers.

The comparator 15 is controlled by the circuit 17 so as to sample the output signals of the output transducers during successive periods when substantially two complete successive bits of the surface acoustic wave corresponding to the i.f. signal lie under the output transducer fingers. Thus, at sampling one bit lies under the group of five finger pairs of a transducer 5 or 6 nearer the input transducer and the other bit lies under the group of five finger pairs of a transducer further from the input transducer.

Considering the output transducer 5, when the two complete bits are of the same phase the contributions to the output signal of the transducer 5 from its different finger pairs are all in phase and the transducer output has a maximum value; similarly when the two complete bits are of opposite phase the contributions to the output signal of the transducer 5 from the group of five finger pairs nearer the input transducer 4 are of opposite phase to the contributions from the group of five finger pairs further from the input transducer 4, and the output of transducer 5 is substantially zero.

In the case of the output transducer 6 the reverse occurs, that is, the transducer output is substantially zero when the two complete bits under the transducer fingers are of the same phase and has a maximum value when the two complete bits under the transducer fingers are of opposite phase.

Thus, when the two complete bits under the output transducer fingers at sampling are of the same phase, the output of transducer 5 exceeds the output of transducer 6 and the comparator 15 produces a negative output signal. Conversely, when the two complete bits under the output transducer fingers at sampling are of opposite phase the output of transducer 5 is less than the output of transducer 6 and the comparator 15 produces a positive output signal. Thus the comparator produces a positive output signal in response to each change of phase in the i.f. output signal, thereby producing an output representative of the binary coded signal modulating the received signal. The comparator output may suitably be arranged to maintain its value between sampling times at the value during the preceding sampling time.

It will be appreciated that the output transducers do not necessarily each have twice as many finger pairs as there are cycles in one bit of the i.f. output signal. Thus the output transducers may each comprise a smaller number of fingers disposed in two groups spaced in the direction of propagation of the acoustic wave such that successive bits of the acoustic wave are respectively under the two groups at sampling times. To this end the centres of the two groups are preferably spaced by a distance substantially equal to the space occupied by one bit of the acoustic wave. Similarly the number of finger pairs in the input transducer may be less than the number of cycles in one bit of the i.f. output signal.

A demodulator for use in the receiver of FIG. 1 in which the numbers of fingers in the transducers are so reduced is shown in FIG. 2, the demodulator of FIG. 2 also being arranged to reduce the effect of reflections from the output transducers.

Referring to FIG. 2 the demodulator includes a substrate 20 on which is formed an input transducer 21 having interdigitated fingers 22 extending from terminals 23, the widths and spacings of the fingers being as described above for FIG. 1.

On one side of the input transducer 21 (the right side in FIG. 2) there is positioned a multistrip coupler 24 of known form which serves to direct the surface acoustic wave received from the input transducer 21 along two parallel paths, one in line with the path of the signal received by the coupler 24 from the input transducer 21 and the other spaced from that path (below it in FIG. 2) in the direction of extent of the strips of the coupler 24.

On the lower path there is positioned an output transducer 25 corresponding to the transducer 5 of FIG. 1. The transducer 25 comprises two identical groups of interdigitated fingers 26 of widths and spacings as described above for FIG. 1, the fingers 26 extending from terminals 27 and 28, and the centres of the two groups being spaced by a distance equal to the space occupied by one bit of the surface acoustic wave launched by the input transducer 21 in operation. On the upper path there is positioned an arrangement of interdigitated fingers 29 corresponding to the finger arrangement of the output transducer 25, the fingers 29 extending from the terminal 27 and a further terminal 30. The purpose of the fingers 29 is explained below.

On the other side of the input transducer 21 there is positioned a second multistrip coupler 31 identical with the coupler 24. On the lower output path from the coupler 31 there is positioned an output transducer 32 corresponding to the output transducer 6 of FIG. 1, the finger arrangement of the transducer 32 thus being the same as that of transducer 25 except that the group of fingers 33 further from the input transducer 21 is reversed with respect to the terminals 34 and 35 of the transducer 32. On the upper output path from the coupler 29 there is positioned an arrangement of interdigitated fingers 36, extending from terminals 34 and 37, corresponding to the finger arrangement of transducer 32.

A blob 38 of lossy material is positioned on an extension of the terminal 23 of the input transducer 21 between the couplers, in line with the lower output paths of the couplers, and further such blobs 39 are positioned adjacent the ends of the finger arrangements 26, 29, 33 and 36 further from the input transducer 21.

It will be appreciated that in operation the output transducers 25 and 32 produce outputs corresponding respectively to the outputs produced by transducers 5 and 6 of FIG. 1. Thus the terminals 27, 28 and 34, 35 are connected to respective inputs of a comparator 40 which is controlled by a circuit 41 so as to sample the output signals of the output transducers during successive periods when successive bits of the surface acoustic waves corresponding to the i.f. output signal are centrally positioned under the groups of output transducer fingers. Hence, a signal representative of the binary coded signal modulating the received signal appears at the output 42 of the comparator.

The terminals 27, 30 and 34, 37 are connected to respective dummy loads 42 and 43 equal to the load presented by the comparator 40 to the transducers 25 and 32. As a result the acoustic wave reflected back to each coupler 24 or 31 from the associated output transducer 25 or 32 is equal to the acoustic wave reflected back to that coupler from the corresponding dummy load finger arrangement 29 or 36. Moreover, since waves transferred from the upper path to the lower path by a coupler 24 or 31 undergo a phase change of 90° in one sense, and waves transferred from the lower to the upper path undergo a phase change of 90° in the other sense, resultant reflected waves are directed only towards the blob 38 of lossy material and not towards the input transducer 21, thus avoiding any interference by such reflected waves with the operation of the demodulator.

It will be appreciated that whilst the two demodulators described above by way of example are for use in a communication system employing binary code differential phase shift modulation, the invention is also applicable to demodulators for use in communication systems employing higher order digital code differential phase shift modulation. In such a demodulator a plurality of output transducers are provided, one for each different phase sequence of successive code elements of the modulated signal which it is necessary to recognise to demodulate the modulated signal, the presence of each different phase sequence being indicated by the corresponding output transducer producing a larger output signal (in a predetermined sense) than the other output transducers.

I claim:

1. A demodulator, for use in a communication system employing digital code differential phase shift modulation, comprising:
   A. a substrate;
   B. an input transducer on the substrate for launching onto the substrate surface acoustic waves corresponding to a digital code differential phase shift modulated signal;
   C. a plurality of output transducers on the substrate,
      i. each of which comprises a number of parts spaced along a substrate propagation path of said acoustic waves so as to produce respective outputs in response to surface waves respectively corresponding to said number of successive code elements of said signal,
      ii. each output transducer being positioned with respect to the input transducer so that its parts are responsive to acoustic waves representing the same successive code elements at any given time,
      iii. each output transducer further comprising
         a. a pair of output terminals between which said parts of that output transducer are connected,
      iv. the parts of each output transducer contributing, to the output appearing between the associated output terminals, signals whose phases are differently related for each output transducer, for any particular phase relation between said successive code elements,
         a. so that each output transducer produces a larger output signal, in a predetermined sense, than any other output transducer when said successive elements have a particular phase relation, different for each output transducer; and
   D. comparator means connected with said output transducers to indicate which output transducer has said larger output signal.

2. A demodulator according to claim 1 for use in a communication system employing binary code differential phase shift modulation comprising two said output transducers both of which comprise two said parts respectively responsive to acoustic waves corresponding to two successive bits of said digital code differential phase shift modulated signal, one output transducer producing the larger output signal when the two successive bits are in phase and the other output transducer producing the larger output signal when the two successive bits differ in phase by an amount corresponding to the differential phase shift employed in modulation.

3. A demodulator according to claim 2 wherein the output transducers each comprise two conducting film electrodes each comprising a set of fingers which are electrically connected together at one end to a said output terminal, the two sets of fingers being interdigitated.

4. A demodulator according to claim 3 wherein each said part of each output transducer comprises a group of $n$ interdigitated fingers spaced apart in the direction of propagation of the acoustic waves, the two groups of fingers of said one transducer being so positioned as to give rise to output signals which are in phase when said two successive bits are in phase, and two groups of fingers of said other transducer being so positioned as to give rise to output signals which are in phase when said two successive bits differ in phase by an amount corresponding to said differential phase shift.

5. A demodulator according to claim 4 wherein the centres of the two groups of fingers of each transducer are spaced by a distance substantially equal to the space occupied by surface acoustic waves corresponding to one bit of said digital code differential phase shift modulated signal.

6. A demodulator according to claim 3 wherein the two output transducers are positioned alongside one another with one set of fingers of each output transducer electrically connected to a common said output terminal.

7. A demodulator according to claim 3 including two multi-strip couplers on the substrate via which said output transducers are respectively coupled to said input transducer, each coupler providing two substantially equal outputs of phase difference 90° in response to an input from the input transducer, one of which outputs is applied to the associated output transducer; two electrode arrangements on said substrate to which the other outputs of said couplers are respectively applied, each said electrode arrangement producing at the associated coupler an input reflected signal corresponding to that produced by the output transducer associated with that coupler; and an acoustically absorbent member on the substrate, each coupler serving to combine its input reflected signals so as to provide an output reflected signal directed towards said acoustically absorbent member and not towards said input transducer.

8. A demodulator according to claim 2 wherein said comparator means comprises:
   a comparator having first and second inputs connected respectively to said two output transducers to produce an output of a first or a second value in dependence on which of the output transducers is producing the larger output signal; and
   control means for the comparator whereby the comparator samples the output signals of the output transducers during successive periods when the acoustic surface waves corresponding to successive bits of said digital code differential phase shift modulated signal lie under respective parts of each output transducer.

* * * * *